US011530043B2

(12) United States Patent
Blanck et al.

(10) Patent No.: US 11,530,043 B2
(45) Date of Patent: Dec. 20, 2022

(54) PASSENGER SEAT HAVING A DISPLACEABLE SEAT ELEMENT

(71) Applicant: Airbus Operations GmbH, Hamburg (DE)

(72) Inventors: Andreas Blanck, Hamburg (DE); Frank Cordes, Hamburg (DE); Jean-Baptiste Jaffrelot, Hamburg (DE); Jan Uwe Nehl, Hamburg (DE); Marcus Boerjesson, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 839 days.

(21) Appl. No.: 16/017,120

(22) Filed: Jun. 25, 2018

(65) Prior Publication Data

US 2018/0305024 A1 Oct. 25, 2018

Related U.S. Application Data

(63) Continuation of application No. PCT/EP2016/070649, filed on Sep. 1, 2016.

(30) Foreign Application Priority Data

Dec. 23, 2015 (DE) .......................... 102015226664.8

(51) Int. Cl.
*B60N 2/02* (2006.01)
*B64D 11/06* (2006.01)
*B64D 11/00* (2006.01)

(52) U.S. Cl.
CPC .......... *B64D 11/0639* (2014.12); *B64D 11/00* (2013.01); *B64D 11/0646* (2014.12);
(Continued)

(58) Field of Classification Search
CPC .............. B64D 11/164; B64D 11/0639; B60N 2/0284; B60N 2/045; B60N 2/0288;
(Continued)

(56) References Cited

U.S. PATENT DOCUMENTS

| | | | | |
|---|---|---|---|---|
| 5,692,802 | A * | 12/1997 | Aufrere ................ | B60N 2/0284 297/311 |
| 5,733,005 | A * | 3/1998 | Aufrere ................ | B60N 2/0284 297/284.1 |

(Continued)

FOREIGN PATENT DOCUMENTS

| | | |
|---|---|---|
| DE | 29617154 | 12/1996 |
| DE | 102006048978 | 4/2008 |

(Continued)

OTHER PUBLICATIONS

International Search Report, dated Jan. 17, 2017, priority document.
German Search Report, dated Aug. 5, 2016, priority document.

*Primary Examiner* — Kyle J. Walraed-Sullivan
(74) *Attorney, Agent, or Firm* — Greer, Burns & Crain, Ltd.

(57) ABSTRACT

A passenger seat comprises a carrier structure, a backrest and a seat element displaceably fastened to the carrier structure, relative to the backrest, in a depth direction of a seating surface of the seat element between a usable position and an out-of-use position. In the usable position, the seat element is arranged, relative to the backrest, so that a front edge of the seat element that faces away from the backrest is arranged at a first distance from a backrest surface of the backrest. In the out-of-use position, the seat element is received, at least partially, in a gap provided between a part of the carrier structure carrying the seat element and an edge of the backrest facing towards the seat element, the front
(Continued)

edge of the seat element being arranged at a second, smaller distance from the backrest surface of the backrest than the first distance.

18 Claims, 10 Drawing Sheets

(52) U.S. Cl.
CPC ........ *B64D 11/0647* (2014.12); *B60N 2/0284* (2013.01); *B64D 11/0696* (2013.01)

(58) Field of Classification Search
CPC ........ B60N 2/18; B60N 2/1803; B60N 2/181; B60N 2/1821; B60N 2/1828; B60N 2/1853; B60N 2/1878; B60N 2/1882; B60N 2/3038; B60N 2/3054; B60N 2/3056; B60N 2/3081; B60N 2/3084; B60N 2002/0212; A47C 1/03294
USPC .......................................................... 297/337
See application file for complete search history.

(56) References Cited

U.S. PATENT DOCUMENTS

| | | | | |
|---|---|---|---|---|
| 5,934,732 A | * | 8/1999 | Jakubiec | B60N 2/309 296/65.09 |
| 5,967,602 A | * | 10/1999 | Ptak | B60N 2/90 297/188.11 |
| 6,328,379 B1 | * | 12/2001 | Merrick | B60N 2/242 297/216.1 |
| 7,083,146 B2 | | 8/2006 | Hiesener | |
| 7,654,602 B2 | * | 2/2010 | Smiley | B66F 9/0759 297/14 |
| 2001/0009335 A1 | * | 7/2001 | Deptolla | B60N 2/26 297/238 |
| 2002/0043851 A1 | * | 4/2002 | Romca | B64D 11/06395 297/354.1 |
| 2004/0195450 A1 | | 10/2004 | Hiesener | |
| 2005/0140195 A1 | | 6/2005 | Koepke et al. | |
| 2007/0096497 A1 | * | 5/2007 | Adragna | B60N 2/305 296/65.16 |
| 2010/0066116 A1 | * | 3/2010 | Coenen | B60R 22/26 296/65.01 |
| 2012/0228912 A1 | * | 9/2012 | Alofs | B60N 2/2209 297/342 |
| 2016/0325838 A1 | * | 11/2016 | Erhel | B64D 11/0641 |

FOREIGN PATENT DOCUMENTS

| | | | | |
|---|---|---|---|---|
| DE | 102008053140 A | | 6/2010 | |
| DE | 102009012900 A | | 9/2010 | |
| DE | 102010039409 | | 2/2012 | |
| DE | 202012102557 | | 10/2012 | |
| EP | 1132294 | | 9/2001 | |
| EP | 1452444 | | 9/2004 | |
| FR | 2754496 | | 4/1998 | |
| JP | 61-057435 | * | 3/1986 | ............... B60N 1/06 |
| WO | 2012011452 | | 1/2012 | |

* cited by examiner

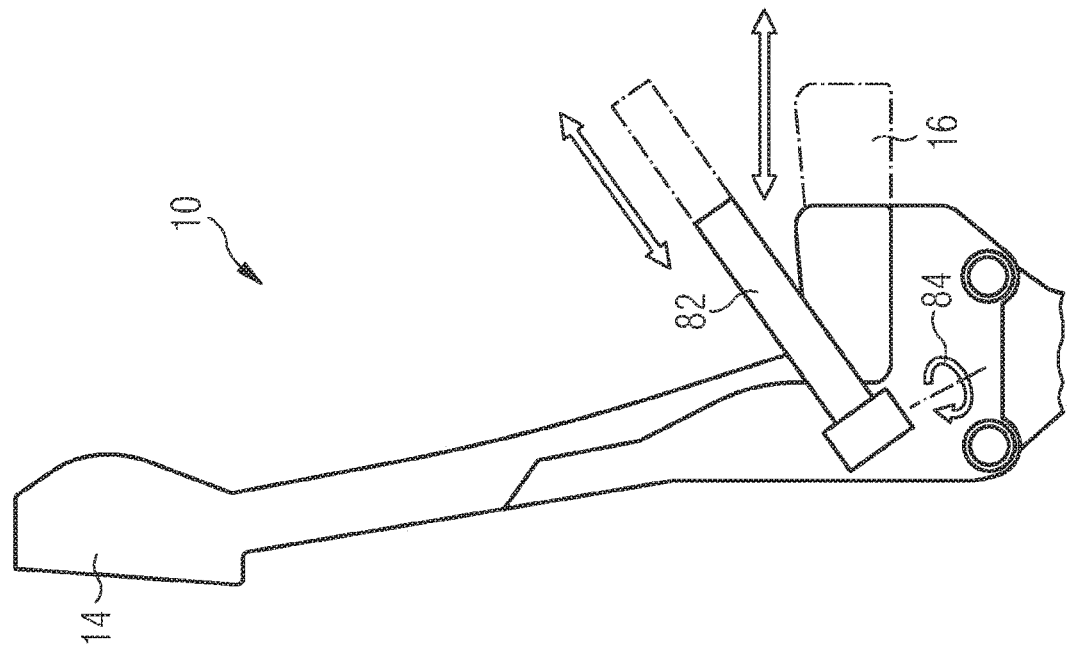
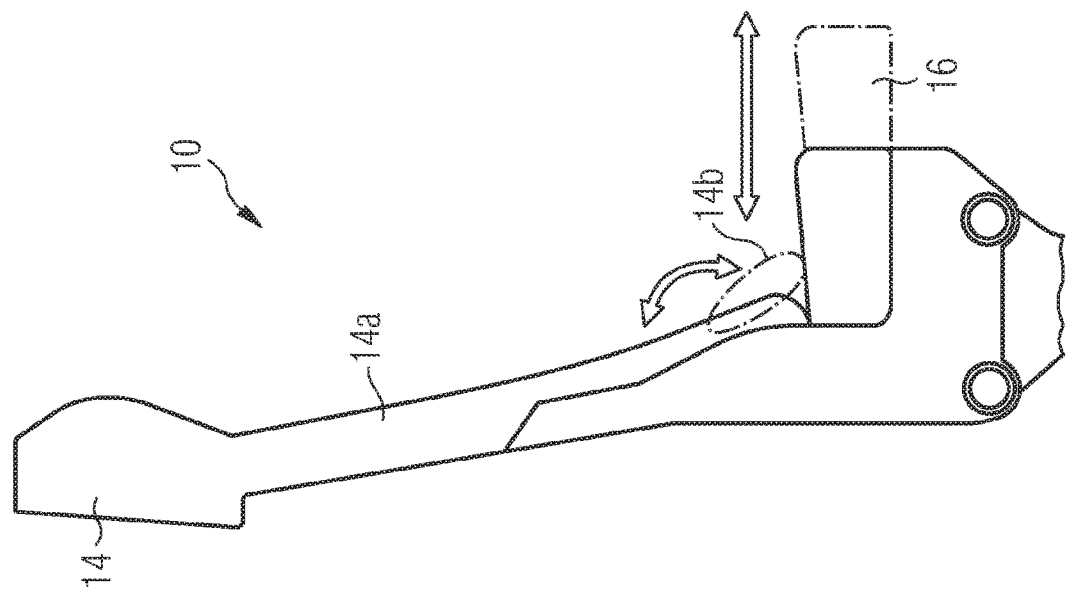

PASSENGER SEAT HAVING A DISPLACEABLE SEAT ELEMENT

CROSS-REFERENCES TO RELATED APPLICATIONS

This application is a continuation of International Application PCT/EP2016/070649 filed Sep. 1, 2016, designating the United States and published on Jun. 29, 2017 as WO 2017/108216. This application also claims the benefit of the German patent application No. 10 2015 226 664.8 filed on Dec. 23, 2015. The entire disclosures of the above are incorporated herein by way of reference.

BACKGROUND OF THE INVENTION

The invention relates to a passenger seat which is suitable for use in the passenger cabin of an aircraft, but also for use in other means of transport such as, for example, buses or trains. The invention also relates to a passenger cabin area equipped with a passenger seat of this kind.

In modern means of transport, particularly in aircraft, optimum utilization of the space available in a passenger cabin is of major economic importance. That is why, particularly in the economy class of an aircraft passenger cabin, seat rows that are arranged one behind another are positioned at the smallest possible distances from one another. In areas of an aircraft passenger cabin which are adjacent to emergency exits, however, it is necessary to provide, between seat rows that are arranged one behind another, transverse aisles which connect a main aisle extending along a longitudinal axis of the aircraft passenger cabin to the emergency exits which are located, for example, above the wings. In order to make possible a rapid flow of passengers to the emergency exits in the event of an emergency evacuation, these transverse aisles must have a stipulated width of, for example, 13 inches (33.02 cm). Accordingly, seat rows bordering the transverse aisles have to be arranged at a relatively wide interval from one another.

EP 1 452 444 B1 and U.S. Pat. No. 7,083,146 B1 describe a seat row arrangement for a passenger cabin of a commercial aircraft with seat rows which are arranged one behind another, the seat rows being arranged at predetermined seat intervals. A transverse aisle which is formed by an increased seat interval between the seat rows is provided in the area of exits, as access to the exits. At least one seat row which is adjacent to the transverse aisle is equipped with passenger seats having a seat part which can be folded upwards, so that the width of the transverse aisle can be changed to a greater width by the upward tilting of the corresponding seat part.

SUMMARY OF THE INVENTION

An underlying object of the invention is to make available a passenger seat which permits optimum utilization of the space available in the passenger cabin of an aircraft or other means of transport, while complying with all the safety requirements regarding dimensions of accesses to emergency exits. The underlying object of the invention is also to indicate a passenger cabin area equipped with a passenger seat of this kind.

A passenger seat comprising a carrier structure is fastenable, for example, in a seat rail provided in a floor of a passenger cabin belonging to a means of transport. The passenger seat also comprises a backrest as well as a seat element. The backrest is preferably fastened to the carrier structure independently of the seat element and can be tilted, relative to the seat element, between an upright position and a reclined position. In particular, the backrest may be fastened to the carrier structure in such a way that there is a gap between an edge of the backrest that faces towards the seat element and a part of the carrier structure that carries the seat element. In a direction of depth of a seating surface of the seat element, the seat element is fastened to the carrier structure so as to be displaceable, relative to the backrest, between a usable position and an out-of-use position. Here, the term "seating surface" designates a surface of the seat element which faces towards the backrest and on which a user of the passenger seat can sit down in the usual way. The term "direction of depth" designates a direction which is defined by a straight line which connects a front edge of the seat element that faces away from the backrest to a rear edge of the seat element that faces towards the backrest when the seat element is in the usable position.

In its usable position, the seat element is arranged in such a way, relative to the backrest, that the front edge of the seat element which faces away from the backrest is arranged at a first distance from a backrest surface of the backrest. Here, the term "backrest surface" designates a front surface of the backrest against which a user of the passenger seat can lean in the usual way when sitting on the seating surface of the seat element. When the seat element is in its usable position, the seating surface of the seat element has a depth which corresponds to the first distance. This depth is preferably chosen in such a way that a user of the passenger seat can sit down comfortably on the seat element, i.e., on the seating surface of the seat element.

In its out-of-use position, on the other hand, the seat element is received, at least partially, in a gap which is provided between a part of the carrier structure that carries the seat element and an edge of the backrest that faces towards the seat element. The front edge of the seat element is then arranged at a second distance from the backrest surface of the backrest that is smaller than the first distance. When the seat element is in its out-of-use position, the seating surface of the seat element consequently has a depth which corresponds to the second distance and which is smaller than the depth that corresponds to the first distance. In its out-of-use position, the seat element thus protrudes less far in the direction of depth of the seating surface, and substantially perpendicularly to the backrest surface of the backrest, than in its usable position.

As a result of the displacement of the seat element from its usable position into its out-of-use position, the size of the passenger seat in the direction of depth of the seating surface of the seat element can be reduced. When the passenger seat is installed in a passenger cabin of a means of transport, for example an aircraft, the distance between the front edge of the seat element and another passenger seat located in front of the passenger seat, can consequently be increased by the displacement of the seat element from its usable position into its out-of-use position. The passenger seat can therefore, in advantageous manner, be installed in a passenger cabin of a means of transport so as to be adjacent to an aisle which provides access to an exit, in particular an emergency exit of the passenger cabin. In particular, the passenger seat may be arranged adjacent to the aisle in such a way that the seat element of the passenger seat faces towards the aisle.

During the normal operation of the means of transport, the passenger seat with the seat element arranged in its usable position may then be used in the usual way and without any loss of comfort for a passenger sitting on the passenger seat. If, on the other hand, passengers are obliged to pass along the aisle to the exit, the seat element can be displaced into its out-of-use position and the aisle thereby widened. As a result, the boarding and alighting of the passengers in a passenger cabin equipped with the passenger seat is facilitated and accelerated. Furthermore, standing up is very convenient for a passenger sitting on the passenger seat, since the displacement of the seat element into its out-of-use position immediately provides the passenger with a large free space for standing. The passenger seat thus permits optimum utilization of the space available in the passenger cabin. At the same time, it is possible to comply with all the safety requirements regarding dimensions of accesses to exits, in particular emergency exits. In a particularly advantageous manner, the passenger seat can be used in an aircraft passenger cabin in a manner adjacent to an emergency exit located above a wing, in order to guarantee a stipulated aisle width of 13 inches (33.02 cm).

In a preferred embodiment of the passenger seat, the seat element protrudes, in its out-of-use position, into the gap which is provided between that part of the carrier structure which carries the seat element and that edge of the backrest which faces towards the seat element, and fills up the gap. A rear edge of the seat element that faces towards the backrest when the seat element is in its usable position is then arranged at a third distance from a rear side of the backrest. Here, the term "rear side" designates a rearward surface of the backrest that may extend, at least in certain sections, substantially parallel to the backrest surface of the backrest. By configuring the seat element in this way, it is possible to minimize the second distance at which the front edge of the seat element is arranged from the backrest, in the out-of-use position of the seat element. The third distance is preferably smaller than the second distance.

The gap which is provided between that part of the carrier structure which carries the seat element and that edge of the backrest which faces towards the seat element may be closed by a cover which is attached in the area of a rear side of the backrest. When the passenger seat is configured in this way, the displacement of the seat element from its usable position into its out-of-use position is limited by the cover, i.e., the cover forms a "stop" for the seat element. This prevents the possibility of a passenger who is sitting on a passenger seat behind the passenger seat with the displaceable seat element being adversely affected by the displacement of the seat element. Furthermore, access into the gap, which forms a cavity, and thereby the depositing of objects in the gap, is prevented by the cover.

A front edge, which faces away from the backrest, of that part of the carrier structure which carries the seat element may protrude less far from the backrest surface, in the direction of depth of the seating surface of the seat element, than the seat element in its out-of-use position, i.e., a distance of the front edge of that part of the carrier structure which carries the seat element from the backrest may be smaller than the second distance. What is prevented by designing the carrier structure in this way is the possibility of that part of the carrier structure which carries the seat element protruding farther from the backrest surface in the direction of depth of the seating surface of the seat element than the seat element in its out-of-use position, and thereby the potential for the reduction in size that can be achieved by the displacement of the seat element being impaired.

In a particularly preferred embodiment of the passenger seat, the front edge, which faces away from the backrest, of that part of the carrier structure which carries the seat element is in alignment with the front edge of the seat element, when the seat element is in its out-of-use position. Such a design of the carrier structure makes possible not only full use of the potential for size reduction that can be achieved by displacement of the seating element, but also, as a result of minimizing the torque acting on the seat element in its usable position, optimization of the carrying and supporting properties of the carrier structure for the seat element.

The seat element preferably comprises a carrier plate and also a seat cushion or seat pad positioned on the carrier plate. In the area of the gap which is provided between that part of the carrier structure which carries the seat element and that edge of the backrest which faces towards the seat element, the carrier plate is preferably provided with an opening which is so dimensioned that any objects which have been put into the gap drop out of the space which forms a cavity. The carrier plate may consist of a rigid material. Equipping the seat element with a rigid carrier plate ensures that the seat element retains its shape, even when, in its usable position, the seat element protrudes, in the direction of depth of its seating surface, beyond the front edge of that part of the carrier structure which carries the seating element.

The carrier plate may be designed in a single part and be moved as a whole when a displacement of the seat element between its usable position and its out-of-use position occurs. As an alternative to this, however, it is also conceivably possible for the carrier plate to be designed in two parts, with a first section and also a second section which is displaceable relative to the first section. For example, the carrier plate may comprise a first section which faces towards the backrest of the passenger seat and is rigidly fixed in position, and also a second section which faces away from the backrest of the passenger seat and is displaceable relative to the first section.

The first and second sections of the carrier plate may be shaped in such a way that a contour of the first section of the carrier plate interacts with a contour, which is shaped in a correspondingly complementary manner, of the second section of the carrier plate, when the seat element is displaced from its usable position into its out-of-use position. As an alternative to this, however, a structure of the carrier plate is also conceivably possible in which the second section of the carrier plate is pushed over or under the first section of the carrier plate when a displacement of the seat element from its usable position into its out-of-use position occurs. A carrier plate which is constructed in two parts has the advantage that it takes up less room, when the seat element is in its out-of-use position, than a carrier plate which is designed in a single part.

The seat pad of the seat element may be capable of retaining its shape when a displacement of the seat element from its usable position into its out-of-use position occurs. This is particularly the case if the carrier plate carrying the seat pad is designed in a single part. As an alternative to this, however, it is also conceivably possible to design the seat pad so as to be compressible or foldable. For example, the seat pad may be of compressible or foldable design in an area that faces away from the backrest.

The passenger seat may further comprise a displacing mechanism which is adapted to displace the seat element relative to the backrest between its usable position and its out-of-use position.

The passenger seat may also comprise a delaying mechanism which is adapted to delay the displacing movement of the seat element between its usable position and its out-of-use position and hence the action of the displacing mechanism. As a result of this, it is possible to prevent the seat element moving back into its out-of-use position immediately if a passenger changes his sitting position and thereby reduces the load acting on the seat element. The delaying mechanism may, for example, be coupled to an armrest of the passenger seat and be activated if the passenger supports himself on the armrest. The delaying mechanism may comprise a cable pull, a deflecting linkage and/or a friction element, which delay(s) the immediate movement of the seat element into its out-of-use position.

The passenger seat may also comprise a damping mechanism for damping the displacing movement of the seat element between its usable position and its out-of-use position. The damping mechanism may comprise at least one oil-pressure damper. The damping mechanism preferably comprises two oil-pressure dampers. One oil-pressure damper may be associated with each pair of springs belonging to the spring arrangement. As an alternative, or in addition, to this, the damping mechanism may also comprise a compressible area of the seat pad belonging to the seat element, i.e., the compressible area of the seat pad may, on being decompressed, damp the displacing movement of the seat element between its usable position and its out-of-use position.

The displacing mechanism may comprise a spring arrangement which biases the seat element into its out-of-use position. The seat element then can be displaced into its out-of-use position automatically by the spring arrangement, i.e., without it being necessary to apply an external actuating force to the seat element. The spring arrangement may comprise at least one spring which extends, for example, substantially parallel to the direction of depth of the seating surface of the seat element. A first end of the spring may be fastened to the carrier structure. A second end of the spring may be fastened to the seat element. The spring then applies to the seat element a tractive force which pulls the seat element from its usable position into its out-of-use position. If desired or necessary, the spring arrangement may also comprise a number of springs which may extend parallel to one another. In particular, the spring arrangement may comprise two pairs of springs which are spaced apart from one another in a direction of width of the seating surface of the seat element. The term "direction of width" designates a direction which is defined by a straight line which connects to one another two lateral edges of the seat element that extend substantially parallel to one another.

In a first embodiment of the displacing mechanism, the first end of the spring is fastened to that part of the carrier structure which carries the seat element in an area which is adjacent to the backrest. The second end of the spring may be fastened to a holding element which is attached to the seat element in the area of an underside of the seat element that faces away from the backrest. The underside of the seat element is preferably formed by an underside of the carrier plate of the seat element, which carrier plate consists of a rigid material. The holding element may be, for example, of web-shaped construction and extend substantially parallel to the direction of width of the seating surface of the seat element.

In a second embodiment of the displacing mechanism, the first end of the spring is fastened to the carrier structure in an area that faces a back edge of the seat element. The back edge of the seat element preferably extends substantially parallel to the front edge of the seat element and faces the backrest of the passenger seat. The second end of the spring may be fastened to a fastening face which extends substantially parallel to the back edge of the seat element.

In a first embodiment, the displacing mechanism comprises a guide apparatus for guiding the seat element upon being displaced between its usable position and its out-of-use position. The guide apparatus may be adapted to guide a translatory movement of the seat element in only one plane and thus guarantees uniform and reproducible movement of the seat element. The guide apparatus may comprise a guide element which is, in particular, of bar-shaped construction. The guide element preferably extends substantially parallel to the direction of depth of the seating surface of the seat element. The guide element may be received in a guide rail which is constructed in a correspondingly complementary manner and which may be fastened to that part of the carrier structure which carries the seat element.

In a second embodiment, the displacing mechanism may comprise a parallelogram mechanism. The parallelogram mechanism may include a first arm and a second arm on both sides of the seat element. The second arm may extend substantially parallel to the first arm. The first arm, in the region of its first end, may be pivotably connected to the part of the carrier structure which carries the seat element. In the region of its second end, the first arm may be pivotably connected to the seat element. In particular, the first arm may be connected to the part of the carrier structure which carries the seat element and an underside of the seat element in a region of the front edge of the seat element. To the contrary, the second arm may be connected to the part of the carrier structure which carries the seat element and an underside of the seat element in a region of the rear edge of the seat element.

When the seat element is arranged in its out-of-use position, the first and the second arm may be inclined towards the backrest of the passenger seat. To the contrary, when the seat element is arranged in its usable position, the first and the second arm may be inclined away from the backrest of the passenger seat. In an intermediate position, in which the seat element is arranged upon being displaced between its out-of-use position and its usable position, the first and the second arm may extend substantially perpendicular to an underside of the seat element. In case the displacement of the seat element is effected by means of a parallelogram mechanism, the movement of the seat element between its out-of-use position and its usable position is no longer a translatory movement in only one plane. Instead, the movement of the seat element follows a circular arc.

Thus, upon being displaced between its out-of-use position and its usable position by means of the parallelogram mechanism, the seat element, in its intermediate position, is elevated from the part of the carrier structure which carries the seat element in its out-of-use position and its usable position. This "elevation" of the seat element has at least some delaying effect on the displacing movement of the seat element between its usable position and its out-of-use position. The provision of a separate delaying mechanism thus may be dispensed with. Upon being elevated from the part of the carrier structure which carries the seat element in its out-of-use position and its usable position, the seat element may temporarily protrude into an area which has to be kept free from the seat element when the seat element is arranged in any one of its out-of-use position and its usable position. Furthermore, at least when being arranged in each of its out-of-use position and its usable position, the seat element is fully supported by the carrier structure. It is thus not necessary to design the parallelogram mechanism in such a manner that it withstands the required crash loads of a passenger seat.

The passenger seat may be equipped with a locking mechanism for locking the seat element in its usable position. Preferably, the locking mechanism is configured to allow a displacement of the seat element from its out-of-use position into its usable position, but to prevent a displacement of the seat element from its usable position into its out-of-use position when a force applied to the seat element by a user of the passenger seat is acting upon the seat element. The locking mechanism prevents the seat element from being immediately forced back into its out-of-use position again by the pretensioning force of the spring arrangement when a displacement of the seat element from its out-of-use position into its usable position occurs, and the locking mechanism thus makes the passenger seat easier to use.

However, the locking mechanism is preferably configured to unlock itself automatically when no force applied to the seat element by a user of the passenger seat is acting upon the seat element. This ensures that the seat element is displaced automatically from its usable position into its out-of-use position when a user of the passenger seat stands up and consequently there is no longer any load acting on the seat element. It is consequently possible to dispense with displacing the seat element manually from its usable position into its out-of-use position when, for example, an aisle bordering on the passenger seat is to be widened by reducing the dimensions of the passenger seat. For example, the locking mechanism may comprise a pair of friction surfaces, two form-locking elements which engage in one another and/or a magnetic locking device.

For example, the locking mechanism may comprise a pneumatic cylinder coupled to the seat element, a valve and an actuator. The valve, in an open state, preferably allows an exchange of air between the pneumatic cylinder and an ambient atmosphere such that the seat element is displaceable between its out-of-use position and its usable position. To the contrary, in a closed state, the valve preferably prevents an exchange of air between the pneumatic cylinder and an ambient atmosphere such that the seat element is prevented from being displaced from its usable position into its out-of-use position. The valve may be movable into its closed state by means of the actuator. The actuator may be movable between an actuated state in which it acts on the valve so as to close the valve and a non-actuated state in which it releases the valve such that the valve is in its open state. The actuator preferably is configured to be moved into an actuated state in which it moves the valve into its closed state when a force applied to the seat element by a user of the passenger seat is acting upon the seat element. Preferably, the actuator is biased into a non-actuated state. For example, the actuator may comprise a pivotable flap connected to the seat element which is forced in the direction of the seat element, and thus the valve, when a person sits down on the passenger seat. The actuator may be biased into its non-actuated state by means of a suitable spring element.

Alternatively or additionally thereto, the locking mechanism may comprise a tooth rack, a latching element and an actuator. The latching element, in a disengaged position, preferably does not engage with the tooth rack such that the seat element is displaceable between its out-of-use position and its usable position. To the contrary, in an engaged position, the latching element preferably engages with the tooth rack such that the seat element is prevented from being displaced from its usable position into its out-of-use position. The latching element may be movable into its engaged position by means of the actuator. The actuator may be movable between an actuated state in which it acts on the latching element so as to move the latching element into its engaged position and a non-actuated state in which it releases the latching element such that the latching element is in its disengaged position. The actuator preferably is configured to be moved into an actuated state in which it moves the latching element into its engaged position when a force applied to the seat element by a user of the passenger seat is acting upon the seat element. Preferably, the actuator is biased into a non-actuated state. Like the actuator of the pneumatic locking mechanism, also the actuator of the mechanical locking mechanism may comprise a pivotable flap connected to the seat element which is forced in the direction of the seat element and thus the valve when a person sits down on the passenger seat. The actuator may be biased into its non-actuated state by means of a suitable spring element.

In a preferred embodiment, the passenger seat further comprises a seat belt configured to secure a passenger sitting on the passenger seat. Preferably, the seat belt is designed in the form of a lap seat belt and attached to the carrier structure of the passenger seat. Preferably, the passenger seat further comprises a seat belt tensioner configured to continuously tension the seatbelt securing a passenger sitting on the passenger seat upon displacement of the seat element between its between its out-of-use position and its usable position. As a result, the passenger is secured to the passenger seat in a safe manner independent on the position of the seat element.

As an alternative to this, however, providing the passenger seat with a locking mechanism may also be intentionally dispensed with in order to make active, dynamic and thereby ergonomically advantageous sitting on the movable seat element possible for a passenger sitting on the passenger seat.

The passenger seat may also comprise a handle which is attached in the area of the front edge of the seat element. The handle may be grasped by a user of the passenger seat in order to displace the seat element from its out-of-use position into its usable position, and thus makes the passenger seat easier to operate.

The handle may, in particular, be attached to that underside of the seat element which faces away from the backrest and which is preferably formed by the underside of the carrier plate consisting of a rigid material. The handle preferably extends substantially perpendicularly from the underside of the seat element and consequently has no effect on the size of the passenger seat in the direction of depth of the seating surface of the seat element.

The backrest of the passenger seat may comprise a first portion facing away from the seat element and a second portion facing the seat element. The second portion of the backrest may be connected to the first portion of the backrest and the seat element in an articulated manner such that the second portion of the backrest, upon displacing the seat element from its out-of-use position into its usable position is pivoted relative to the first portion of the backrest and the seat element in order to reduce a first angle defined between the first and the second portion of the backrest and to simultaneously enlarge second angle defined between the second portion of the backrest and the seat element.

The first angle defined between the first and the second portion of the backrest, upon displacing the seat element from its out-of-use position into its usable position, due to the pivoting movement of the second portion of the backrest relative to the first portion of the backrest, may, for example, be reduced from approximately 180° to approximately 150°. The second angle defined between the second portion of the backrest and the seat element, upon displacing the seat element from its out-of-use position into its usable position, due to the pivoting movement of the second portion of the backrest relative to the seat element, may, for example, be enlarged from approximately 90-100° to approximately 130-140°. As a result, a smooth transition between the backrest and the seat element is provided when the seat element is arranged in its usable position which provides additional support to the lower back of a passenger sitting on the passenger seat. Furthermore, the gap between the part of the carrier structure that carries the seat element and the edge of the backrest that faces towards the seat element is kept covered.

A passenger cabin area comprises a main aisle which extends substantially parallel to a longitudinal axis of the passenger cabin area. The passenger cabin area also comprises an exit as well as a transverse aisle which connects the main aisle to the exit. At least one passenger seat which has been described above is arranged in the passenger cabin area in a manner adjacent to the transverse aisle in such a way that the seat element of the passenger seat faces towards the transverse aisle. Within a passenger cabin area of this kind, the transverse aisle can be widened through the fact that the size of the passenger seat can be reduced in the direction of depth of the seating surface of the seat element by displacing the seat element from its usable position into its out-of-use position.

In a preferred embodiment of the passenger cabin area, the exit in question is an emergency exit.

The passenger seat described above and/or the passenger cabin area described above is/are particularly suitable for use in an aircraft. The passenger cabin area in question may be, in particular, an aircraft passenger cabin area which has an emergency exit located above a wing and in which a stipulated transverse aisle width of 13 inches is to be guaranteed.

BRIEF DESCRIPTION OF THE DRAWINGS

Preferred embodiments of the invention will now be explained in greater detail with the aid of the appended diagrammatic drawings, in which:

FIG. 12 shows an embodiment of a passenger seat which is equipped with a backrest having a first portion and the second portion;

FIG. 13 shows a seatbelt and a seat belt tensioner that can be used in the passenger seat according to FIG. 1;

DETAILED DESCRIPTION OF THE PREFERRED EMBODIMENTS

Figure 1:
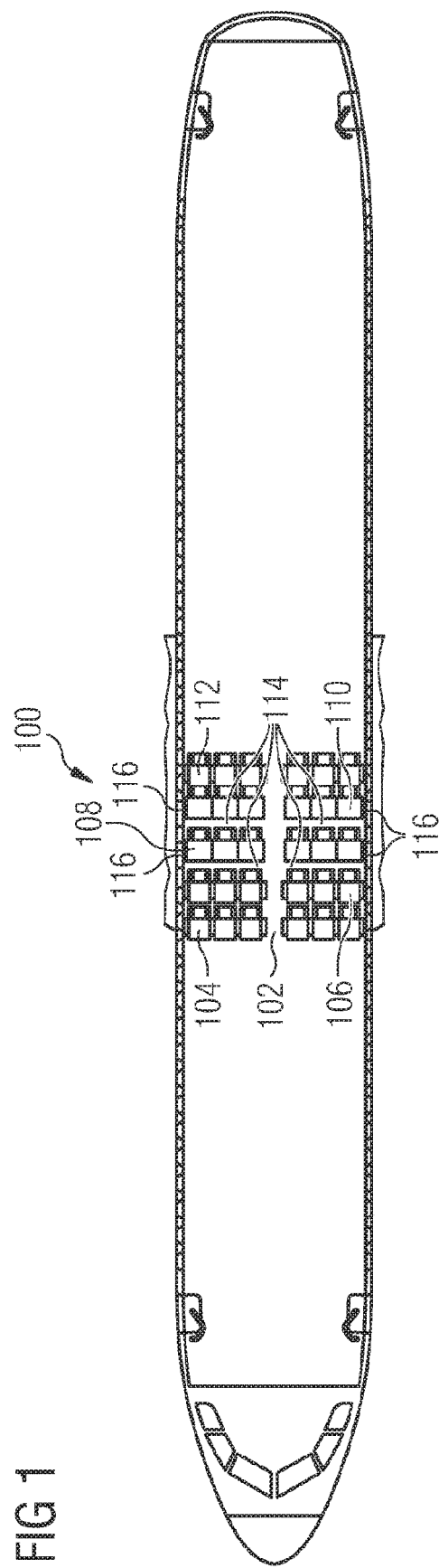
FIG. 1 shows a passenger cabin area in which a number of passenger seats are arranged.

FIG. 1 shows a passenger cabin area 100 which, in the embodiment shown here, forms part of an aircraft passenger cabin. The passenger cabin area 100 comprises a main aisle 102 which extends substantially parallel to a longitudinal axis L of the passenger cabin area 100. Installed in the passenger cabin area 100 are a number of passenger seat rows 104, 106, 108, 110, 112. Transverse aisles 114, which connect the main aisle 102 to emergency exits 116, are provided, in each case, between passenger seat rows 106 and 108 and passenger seat rows 108 and 110. In the embodiment of an aircraft passenger cabin area 100 shown in FIG. 1, the emergency exits 116 are positioned above the wings of the aircraft.

The transverse aisles 114 must have a stipulated width in order to be able to guarantee an adequate flow of passengers along the transverse aisles 114 to the emergency exits 116 in the event of an emergency evacuation of the aircraft passenger cabin. For this reason, in the arrangement according to FIG. 1, the distance between passenger seats arranged one behind another in passenger seat rows 106 and 108, and passenger seats arranged one behind another in passenger seat rows 108 and 110, is greater, in each case, than the distance between passenger seats arranged one behind another in passenger seat rows 104 and 106, and passenger seats arranged one behind another in passenger seat rows 110 and 112.

A first embodiment of a passenger seat 10 which is suitable for installation in passenger seat rows 106 and 108 in the passenger cabin area 100 shown in FIG. 1 is illustrated in greater detail in FIGS. 2 to 6. The passenger seat 10 comprises a carrier structure 12. The passenger seat 10 also comprises a backrest 14 as well as a seat element 16. The backrest 14 is fastened to the carrier structure 12 independently of the seat element 16 in such a way that the backrest 14 can be tilted between an upright position and a folded-back position. If desired, however, the backrest 14 may also be attached rigidly, i.e., in a non-tiltable manner, to the carrier structure 12. As can be seen, in particular, from FIGS. 5 and 6, the backrest 14 is fastened to the carrier structure 12 in such a way that there is a gap 22 between an edge 18 of the backrest 14 that faces towards the seat element 16 and a part 20 of the carrier structure 12 that carries the seat element 16. In other words, that edge 18 of the backrest 14 which faces towards the seat element 16 is arranged at a distance Z from that part 20 of the carrier structure 12 which carries the seat element 16.

Figure 2:
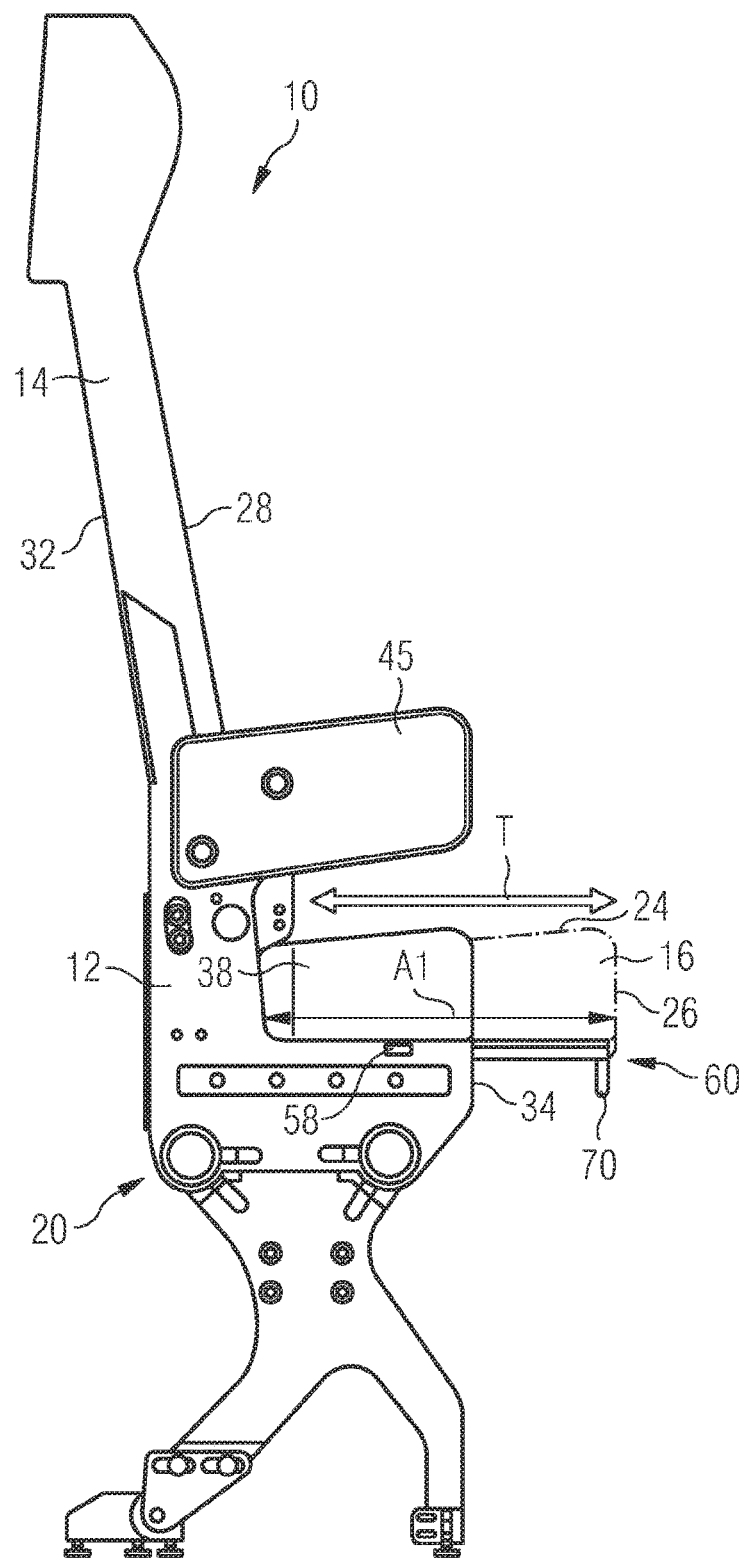
FIG. 2 shows a side view of a first embodiment of a passenger seat which is suitable for installation in the passenger cabin area according to FIG. 1 and has a seat element which is arranged in a usable position.
Figure 3:
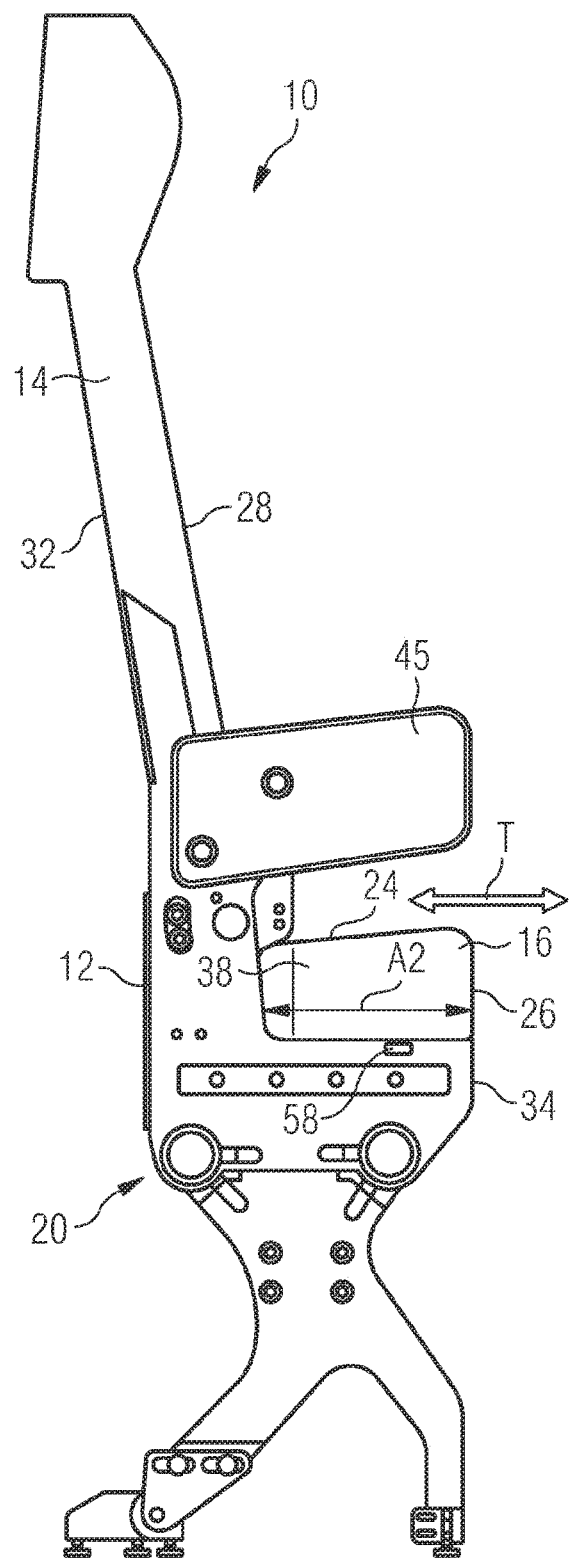
FIG. 3 shows a side view of the passenger seat according to FIG. 2, with a seat element arranged in an out-of-use position.

As becomes clear from a comparison of FIGS. 2 and 3, the seat element 16 is fastened to the carrier structure 12 so as to be displaceable, relative to the backrest 14, in a direction of depth T of a seating surface 24 of the seat element 16 between a usable position and an out-of-use position. In its usable position—see FIG. 2—, the seat element 16 is arranged, relative to the backrest 14, in such a way that a front edge 26 of the seat element 16 that faces away from the backrest 14 is arranged at a first distance A1 from a backrest surface 28 of the backrest 14. When the seat element 16 is in its usable position, the seating surface 24 of the seat element 16 has a depth which corresponds to the first distance A1 and which is chosen in such a way that a user of the passenger seat 10 can sit down comfortably on the seat element 16, i.e., on the seating surface 24 of the seat element 16.

In its out-of-use position—see FIG. 3—on the other hand, the seat element 16 is partially received in the gap 22 (illustrated in FIG. 6) which is provided between that part 20 of the carrier structure 12 which carries the seat element 16 and that edge 18 of the backrest 14 which faces towards the seat element 16. The front edge 26 of the seat element 16 is then arranged at a second distance A2 from the backrest 14 that is smaller than the first distance A1. When the seat element 16 is in its out-of-use position, the seating surface 24 of the seat element 16 consequently has a depth which corresponds to the second distance A2 and which is smaller than the depth that corresponds to the first distance A1. In its out-of-use position, the seat element 16 thus protrudes less far in the direction of depth T of the seating surface 24, and substantially perpendicularly to the backrest surface 28 from the backrest surface 28, than in its usable position.

As a result of the displacement of the seat element 16 from its usable position into its out-of-use position, the size of the passenger seat 10 in the direction of depth T of the seating surface 24 of the seat element 16 can be reduced. When the passenger seat 10 is installed in the passenger cabin area 100, in passenger seat rows 106 and 108, in a manner adjacent to the transverse aisles 114 in such a way that the seat element 16 of the passenger seat 10 faces towards the particular transverse aisle 114, the distance between the front edge 26 of the seat element 16 and another passenger seat located in front of the passenger seat 10, can thus be increased by displacement of the seat element 16 from its usable position into its out-of-use position. During the normal operation of an aircraft equipped with the passenger cabin area 100, the passenger seat 10 with the seat element 16 arranged in its usable position may be used in the usual way and without any loss of comfort for a passenger sitting on the passenger seat 10. If, on the other hand, passengers are obliged to pass along the transverse aisle 114 to the exit 116, the seat element 16 can be displaced into its out-of-use position and the aisle 114 thereby widened.

Figure 5:
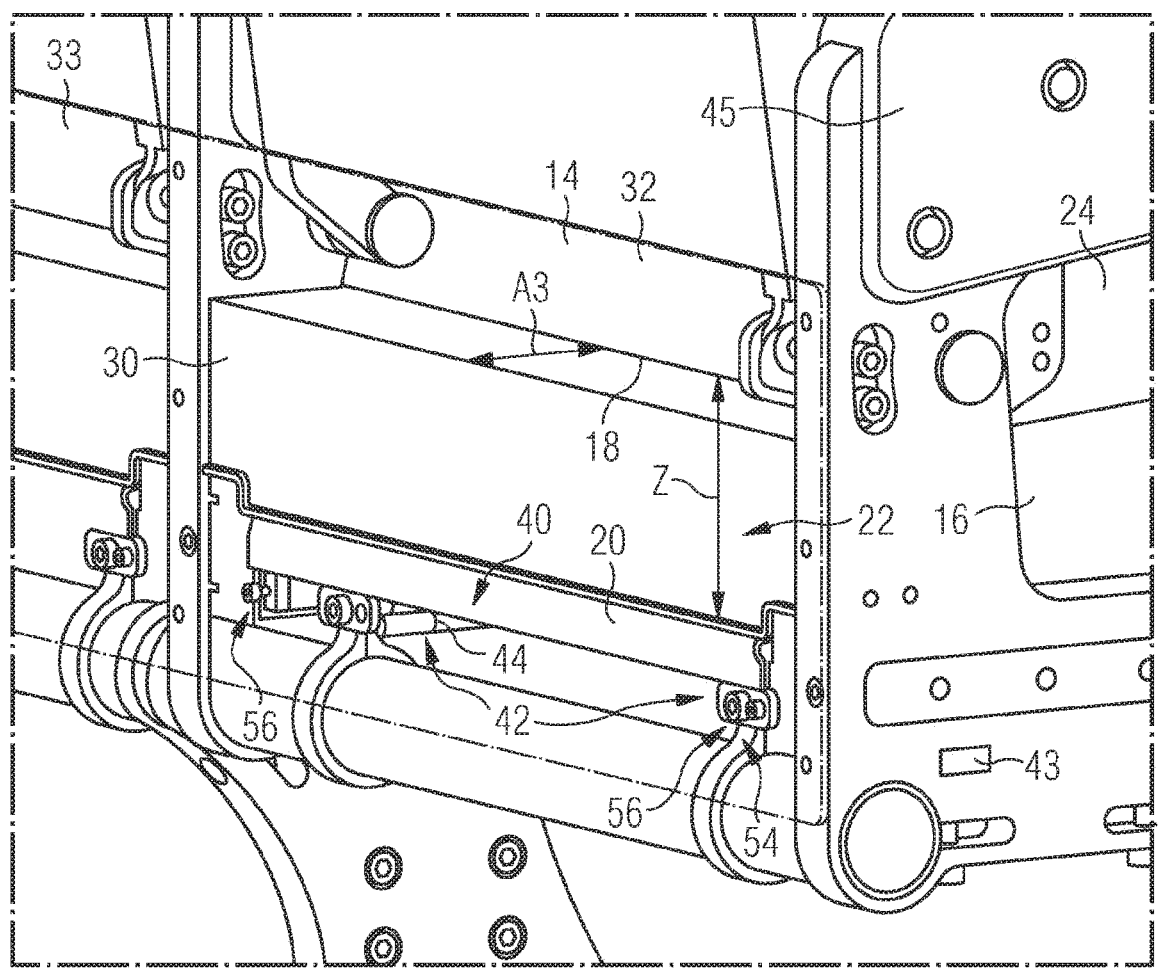
FIG. 5 shows a three-dimensional detail view of the passenger seat according to FIG. 2.
Figure 6:
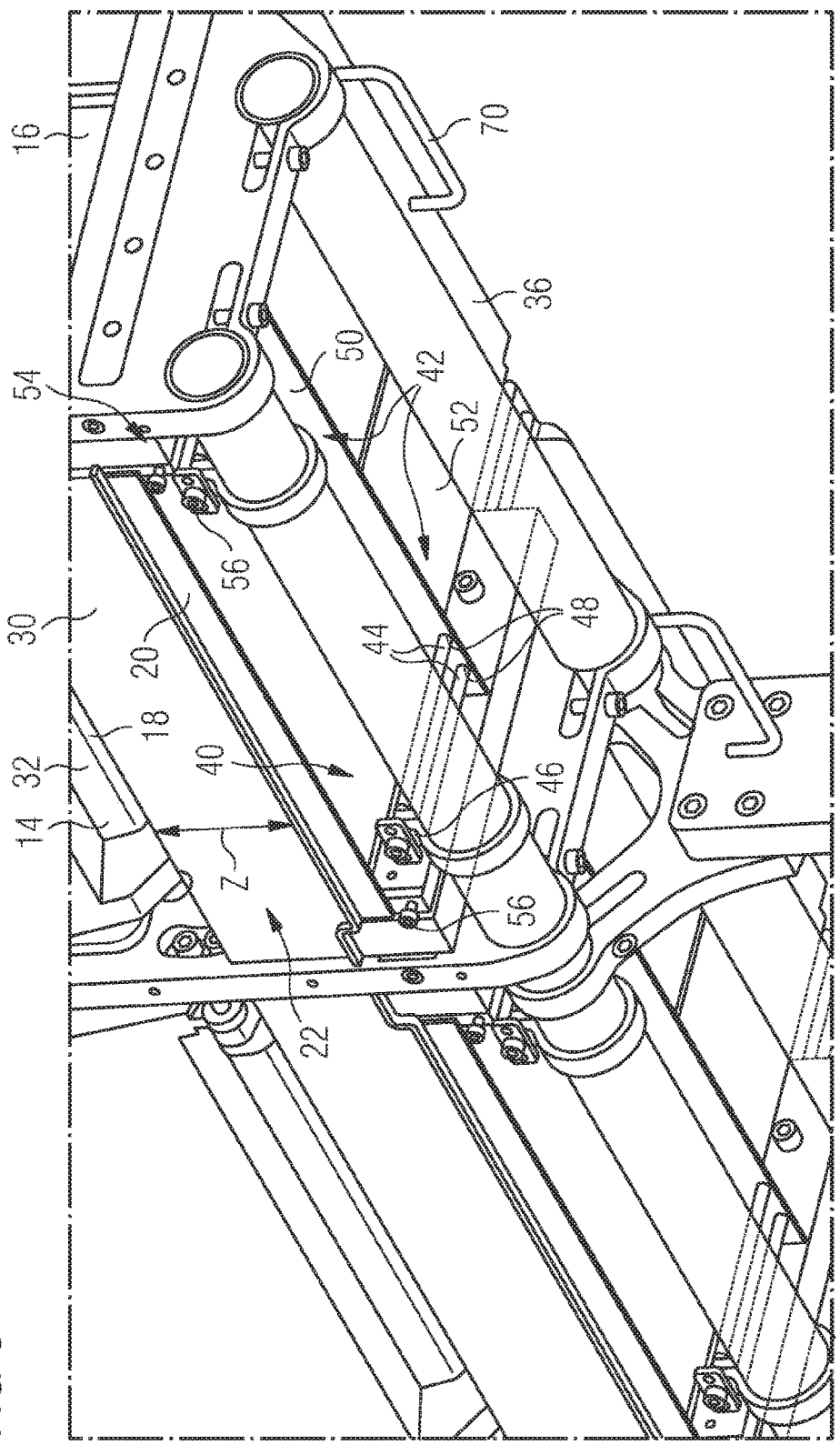
FIG. 6 shows a second three-dimensional detail view of the passenger seat according to FIG. 2.

As can be seen, in particular, from FIG. 6, the seat element 16 protrudes, in its out-of-use position, into the gap 22 which is provided between that part 20 of the carrier structure 12 which carries the seat element 16 and that edge 18 of the backrest 14 which faces towards the seat element 16, and fills the space. A rear edge 30 of the seat element 16 that faces towards the backrest 14 when the seat element 16 is in its usable position is arranged at a third distance A3 from a rear side 32 of the backrest 14. The third distance A3 is smaller than the second distance A2. This configuration of the passenger seat 10 makes it possible to minimize the second distance A2. The gap 22 is closed by a cover 33 (indicated by the dot-dashed line in FIG. 5) which is attached in the area of a rear side of the backrest and which, on displacement of the seat element 16 from its usable position into its out-of-use position, forms a "stop" for the seat element 16 and prevents the deposition of objects in the gap 22.

As becomes clear, in particular, from FIG. 3, a front edge 34, which faces away from the backrest 14, of that part 20 of the carrier structure 12 which carries the seat element 16 is in alignment with the front edge 26 of the seat element 16, when the seat element 16 is in its out-of-use position. The seat element 16 comprises a carrier plate 36 that comprises a rigid material. A seat pad 38 belonging to the seat element is arranged on the carrier plate 36. The carrier plate 36 ensures that the seat element 16 retains its shape when the seat element 16 protrudes, in its usable position, in the direction of depth T of the seating surface 24 of the seat element 16 beyond the front edge 34 of that part 20 of the carrier structure 12 which carries the seat element 16. In the area of the gap 22 which is provided between that part 20 of the carrier structure 12 which carries the seat element 16 and that edge 18 of the backrest 14 which faces towards the seat element 16, the carrier plate 36 is provided with an opening (not shown in the figures) which is so dimensioned that any objects which have been put into the gap 22 drop out of the gap 22, which forms a cavity.

Figure 4:
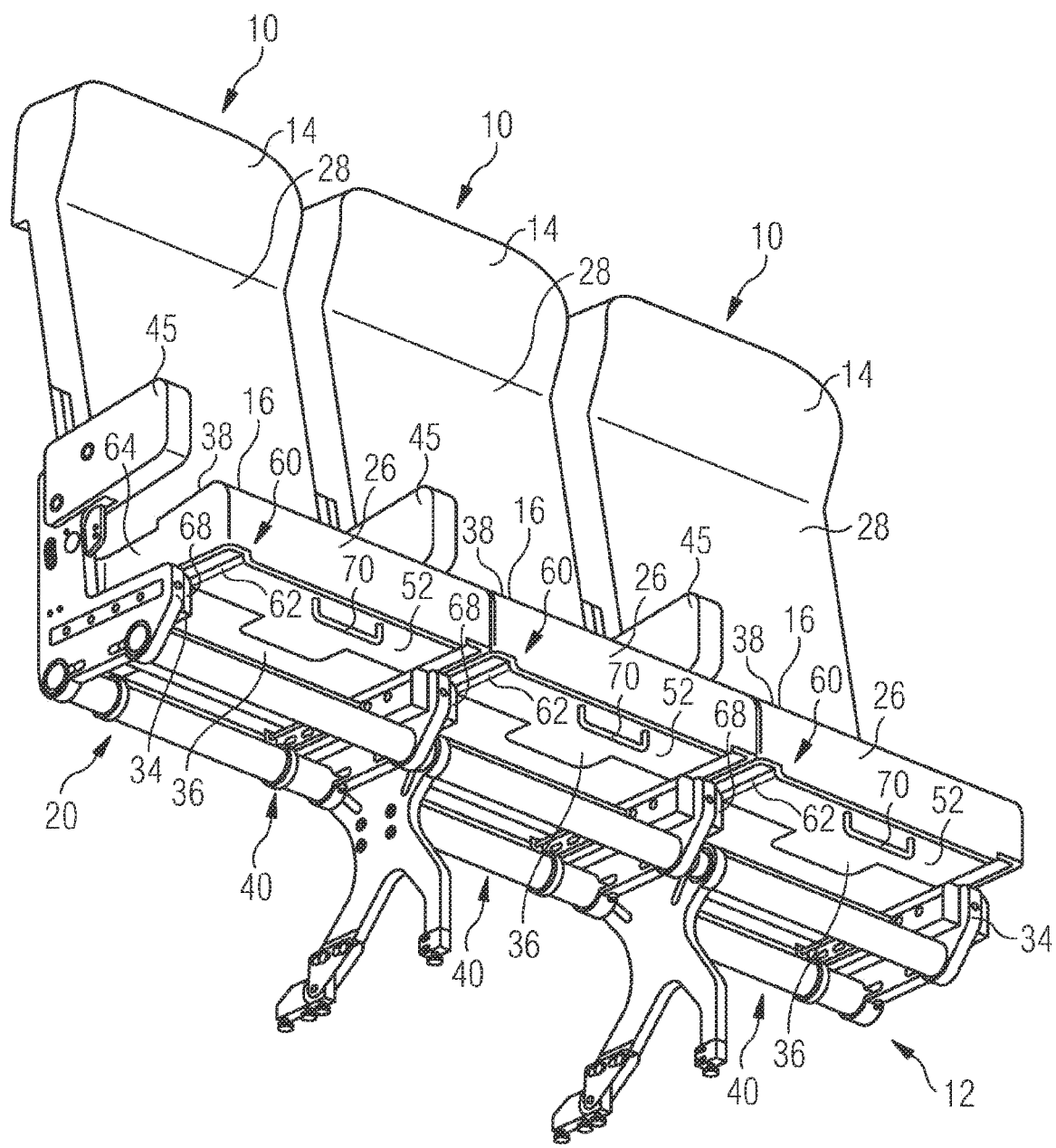
FIG. 4 shows a three-dimensional view of a passenger seat row comprising three passenger seats according to FIG. 2.

A displacing mechanism 40 for displacing the seat element 16 relative to the backrest 14 is illustrated in greater detail in FIGS. 4 to 6. The displacing mechanism 40 comprises a spring arrangement 42 which pretensions the seat element 16 into its out-of-use position. The displacing mechanism 40 also comprises a delaying mechanism 43 (schematically illustrated in FIG. 5) which delays the displacing movement of the seat element 16 between its out-of-use position and its usable position. The delaying mechanism 43 prevents the seat element 16 from moving back into its out-of-use position immediately if a passenger changes his sitting position and thereby reduces the load acting on the seat element 16. The delaying mechanism is coupled to an armrest 45 of the passenger seat and is activated if the passenger supports himself on the armrest 45. The delaying mechanism 43 may comprise, for example, a cable pull, a deflecting linkage and/or a friction element, which delay(s) the immediate movement of the seat element 16 into its out-of-use position.

In the arrangement of FIGS. 4 to 6, the spring arrangement 42 comprises two pairs of springs 44 which are spaced apart from one another in a direction of width of the seating surface 24 of the seat element 16. Each spring 44 extends substantially parallel to the direction of depth T of the seating surface 24 of the seat element 16. In an area, which is adjacent to the backrest 14, of that part 20 of the carrier structure 12 which carries the seat element 16, a first end 46 of each spring 44 is fastened to that part 20 of the carrier structure 12 which carries the element 16—see FIG. 6. On the other hand, a second end 48 of each spring 44 is fastened to the seat element 16. In particular, the second end 48 of each spring 44 is fastened to a holding element 50 which is attached to the seat element 16 in the area of an underside 52 of the seat element 16 that faces away from the backrest 14. The holding element 50 is of web-shaped construction and extends substantially parallel to the direction of width of the seating surface 24 of the seat element 16.

The displacing mechanism 40 also comprises a damping mechanism 54 for damping the displacing movement of the seat element 16 between its usable position and its out-of-use position. In the embodiment of a passenger seat 10 shown in FIGS. 1 to 6, the damping mechanism 54 comprises two oil-pressure dampers 56, one oil-pressure damper 54 being associated with each pair of springs 44 belonging to the spring arrangement 42.

The passenger seat 10 is also equipped with a locking mechanism 58 for locking the seat element 16 in its usable position. In particular, the locking mechanism 58 allows a displacement of the seat element 16 from its out-of-use position into its usable position, but prevents a displacement of the seat element 16 from its usable position into its out-of-use position when a force applied to the seat element 16 by a user of the passenger seat is acting upon the seat element 16. The locking mechanism 58 prevents the seat element 16 from being immediately forced back into its out-of-use position again by the pretensioning force of the spring arrangement 42 when a displacement of the seat element 16 from its out-of-use position into its usable position occurs. However, the locking mechanism 58 is configured to unlock itself automatically when no force applied to the seat element 16 by a user of the passenger seat 10 is acting upon the seat element 16. This ensures that the seat element 16 is displaced automatically from its usable position into its out-of-use position when a user of the passenger seat 10 stands up and consequently there is no longer any load acting on the seat element 16.

Figure 10:
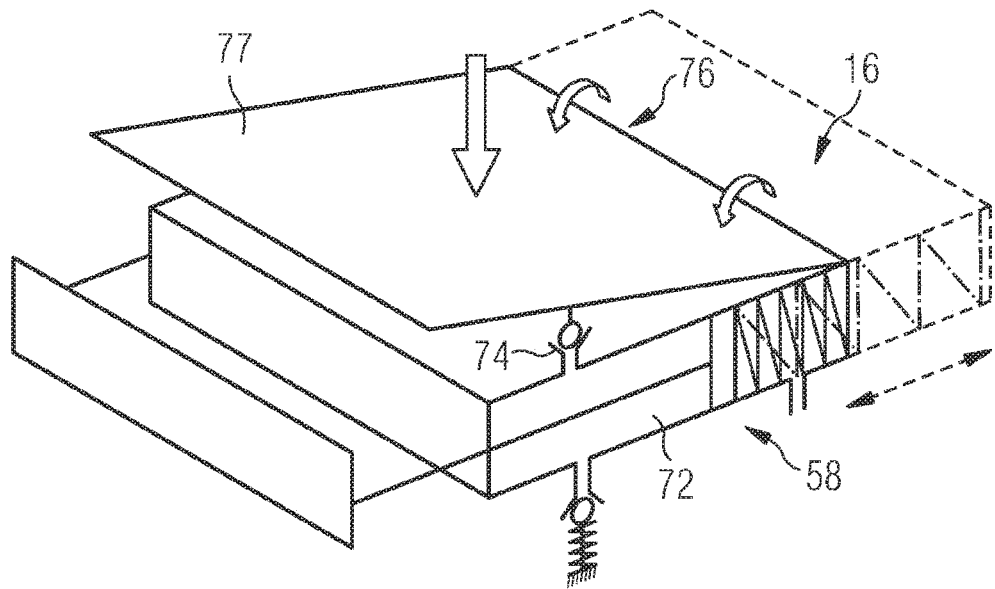
FIG. 10 shows a detail representation of a first embodiment of a locking mechanism that can be used in the passenger seat according to FIG. 1.

A first embodiment of a locking mechanism 58 is depicted in FIG. 10. In pneumatic arrangement according to FIG. 10, the locking mechanism 58 comprises a pneumatic cylinder 72 which is coupled to the seat element 16, a valve 74 and an actuator 76. The valve 74, in an open state, allows an exchange of air between the pneumatic cylinder 72 and an ambient atmosphere. Consequently, the seat element 16 is displaceable between its out-of-use position and its usable position. To the contrary, in a closed state, the valve 74 prevents an exchange of air between the pneumatic cylinder 72 and an ambient atmosphere. Hence, the seat element 16 is prevented from being displaced from its usable position back into its out-of-use position. The valve 74 is movable into its closed state by means of the actuator 76. The actuator 76 is movable between an actuated state in which it acts on the valve 74 so as to close the valve 74 and a non-actuated state in which it releases the valve 74 such that the valve 74 is in its open state. In particular, the actuator 76 is configured to be moved into an actuated state in which it moves the valve 74 into its closed state when a force applied to the seat element 16 by a user of the passenger seat is acting upon the seat element 16.

The actuator 76 is biased into a non-actuated state by means of a suitable spring element (not shown). Furthermore, the actuator 76 comprises a pivotable flap 77 that is pivotably connected to the seat element 16. By means of the spring element, the pivotable flap 77 is urged away from the seating surface 24 of the seat element 16. To the contrary, when a person sits down on the passenger seat 10, the flap 77 is forced in the direction of the seat element 16 and thus the valve 74 is closed.

Figure 11:
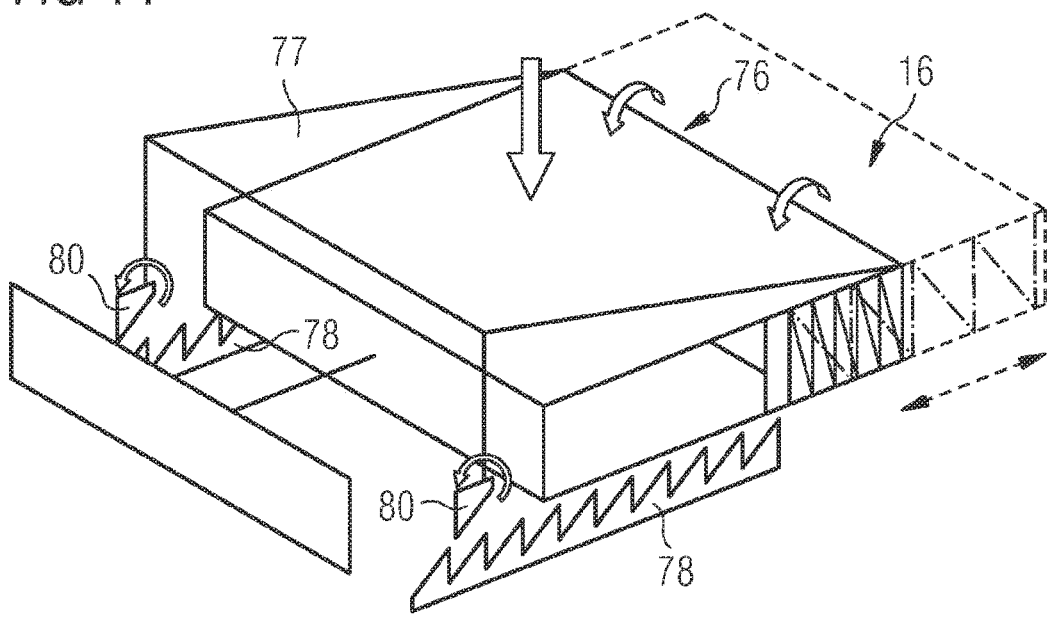
FIG. 11 shows a detail representation of a second embodiment of a locking mechanism that can be used in the passenger seat according to FIG. 1.

An alternative embodiment of the locking mechanism 58 is shown in FIG. 11. In the mechanical arrangement according to FIG. 11, the locking mechanism 58 comprises a tooth rack 78, a latching element 80 and an actuator 76 which has a similar design as the actuator 76 employed in the pneumatic locking mechanism 58 described above. In a disengaged position, the latching element 80 does not engage with the tooth rack 78 such that the seat element 16 is displaceable between its out-of-use position and its usable position. To the contrary, in an engaged position, the latching element 80 engages with the tooth rack 78 such that the seat element 16 is prevented from being displaced from its usable position back into its out-of-use position. A displacement of the seat element 16 in a direction from its out-of-use position into its usable position, however, is still possible. The latching element 80 is movable into its engaged position by means of the actuator 76. The actuator 76 again is movable between an actuated state in which it acts on the latching element 80 so as to move the latching element 80 into its engaged position and a non-actuated state in which it releases the latching element 80 such that the latching element is in its disengaged position. The actuator 76 again is configured to be moved into an actuated state in which it moves the latching element 80 into its engaged position when a force applied to the seat element 16 by a user of the passenger seat 10 is acting upon the seat element 16 and biased into a non-actuated state as described above.

In the arrangement of FIGS. 4 to 6, the displacing mechanism 40 also comprises a guide apparatus 60 for guiding the seat element 16 when it is displaced between its usable position and its out-of-use position. The guide apparatus 60 guides a translatory movement of the seat element in only one plane and comprises a guide element 62 which is of bar-shaped construction and which extends, in the area of the underside 52 of the seat element 16, substantially parallel to the direction of depth T of the seating surface 24 of the seat element 16 and parallel to a lateral edge 64 of the seat element 16. The guide element 62 is received in a guide rail 68 which is constructed in a correspondingly complementary manner, the guide element 62 protruding, as shown in FIG. 4, out of the guide rail 68 in the direction of depth T of the seating surface 24 of the seat element 16 when the seat element 16 is in its usable position.

Finally, the passenger seat 10 comprises a handle 70 which is attached in the area of the front edge 26 of the seat element 16. The handle 70 is attached to the underside 52 of the seat element 16 and extends substantially perpendicularly from the underside 52 of the seat element 16. The handle 70 can be grasped by a user of the passenger seat 10 in order to displace the seat element 16 from its out-of-use position into its usable position.

Figure 7:
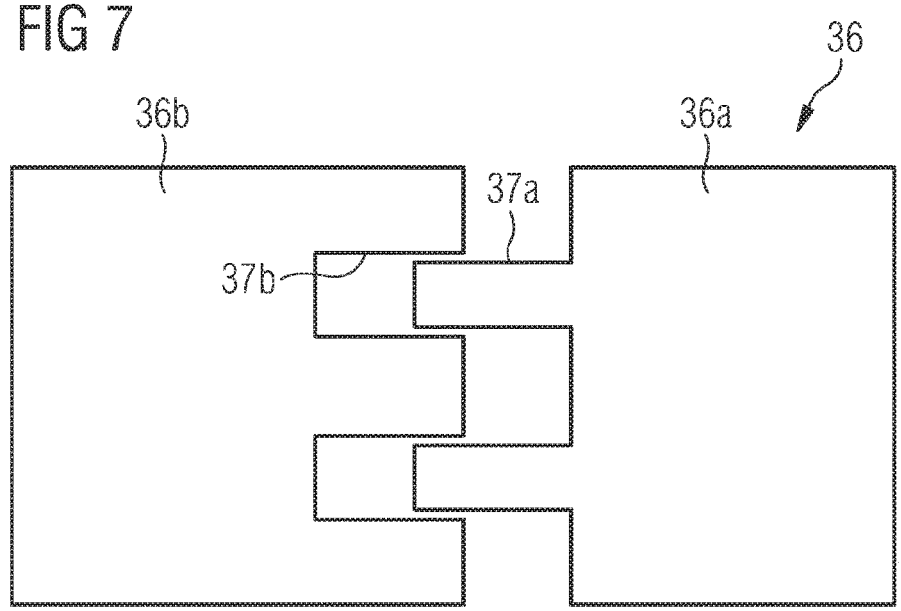
FIG. 7 shows a detail representation of an alternative carrier plate that can be used in the passenger seat according to FIG. 1.

In the passenger seat 10 shown in FIGS. 1 to 6, the carrier plate 36 is designed in a single part and is moved as a whole when a displacement of the seat element 16 between its usable position and its out-of-use position occurs. As an alternative to this, however, it is also conceivably possible to design the carrier plate 36 in two parts, as illustrated in FIG. 7, with a first section 36a which faces towards the backrest 14 of the passenger seat 10 and is rigidly fixed in position, and also a second section 36b which faces away from the backrest 14 of the passenger seat 10 and is displaceable relative to the first section 36a.

The first and second sections 36a, 36b of the carrier plate 36 are shaped in such a way that a contour 37a of the first section 36a of the carrier plate 36 interacts with a contour 37b, which is shaped in a correspondingly complementary manner, of the second section 36b of the carrier plate 36, when the seat element 16 is displaced from its usable position into its out-of-use position. As an alternative to this, however, a structure of the carrier plate 36 is also conceivably possible in which the second section 36b of the carrier plate 36 is pushed over or under the first section 36a of the carrier plate 36 when a displacement of the seat element 16 from its usable position into its out-of-use position occurs.

Figure 8:
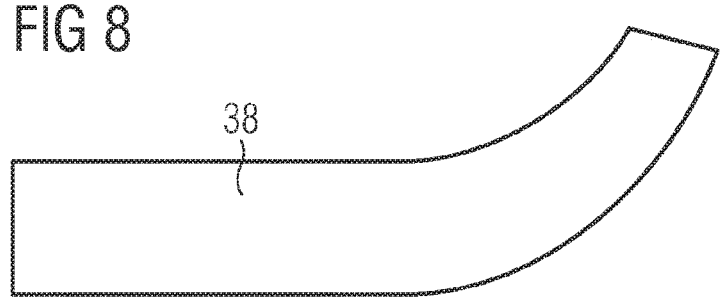
FIG. 8 shows a detail representation of an alternative seat pad that can be used in the passenger seat according to FIG. 1.
Figure 9:
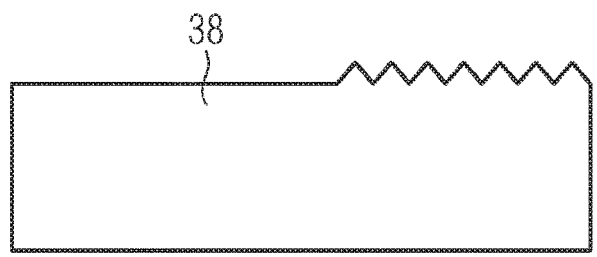
FIG. 9 shows a detail representation of another alternative seat pad that can be used in the passenger seat according to FIG. 1.

In the passenger seat 10 shown in FIGS. 1 to 6, the seat pad 38 of the seat element 16 retains its shape when a displacement of the seat element 16 from its usable position into its out-of-use position occurs. As an alternative to this, however, it is also conceivably possible to design the seat pad so as to be foldable, as shown in FIG. 7, or compressible, as illustrated in FIG. 8. In the arrangements according to FIGS. 7 and 8, the seat pad 38 can, in each case, be folded upwards and compressed respectively, in an area that faces towards the backrest 14. The damping mechanism may then also comprise a compressible area of the seat pad 38 of the seat element 16, i.e., the compressible area of the seat pad 38 may, on being decompressed, damp the displacing movement of the seat element 16 between its usable position and its out-of-use position.

As becomes apparent from FIG. 12, the backrest 14 of the passenger seat 10 may comprise a first upper portion 14a facing away from the seat element 16 and a second lower portion 14b facing the seat element 16. In the arrangement of FIG. 12, the second portion 14b of the backrest 14 is connected to the first portion 14a of the backrest 14 and the seat element 16 in an articulated manner such that the second portion 14b of the backrest 14, upon displacing the seat element 16 from its out-of-use position into its usable position is pivoted relative to the first portion 14a of the backrest 14 and the seat element 16 in order to reduce a first angle α defined between the first and the second portion 14a, 14b of the backrest 14 and to simultaneously enlarge second angle β defined between the second portion 14b of the backrest 14 and the seat element 16.

The first angle α defined between the first and the second portion 14a, 14b of the backrest 14, upon displacing the seat element 16 from its out-of-use position into its usable position, due to the pivoting movement of the second portion 14b of the backrest 14 relative to the first portion 14a of the backrest 14 is reduced from approximately 180° to approximately 150°. The second angle β defined between the second portion 14b of the backrest 14 and the seat element 16, upon displacing the seat element 16 from its out-of-use position into its usable position, due to the pivoting movement of the second portion 14b of the backrest 14 relative to the seat element 16 is enlarged from approximately 90-100° to approximately 130-140°. As a result, a smooth transition between the backrest 14 and the seat element 16 is provided when the seat element 16 is arranged in its usable position. Furthermore, the gap 22 between the part 20 of the carrier structure 12 that carries the seat element 16 and the edge 18 of the backrest 14 that faces towards the seat element 16 is kept covered.

As shown in FIG. 13, the passenger seat 10 may further comprise a seat belt 82 which is configured to secure a passenger sitting on the passenger seat 10. Typically, the seat belt 82 is designed in the form of a lap seat belt and attached to the carrier structure 12 of the passenger seat 10. The passenger seat 10 depicted in FIG. 13 further comprises a seat belt tensioner 84 which is configured to continuously tension the seatbelt 82 securing a passenger sitting on the passenger seat 10 upon displacement of the seat element 16 between its between its out-of-use position and its usable position. As a result, the passenger is secured to the passenger seat 10 in a safe manner independent on the position of the seat element 16.

Figure 14:
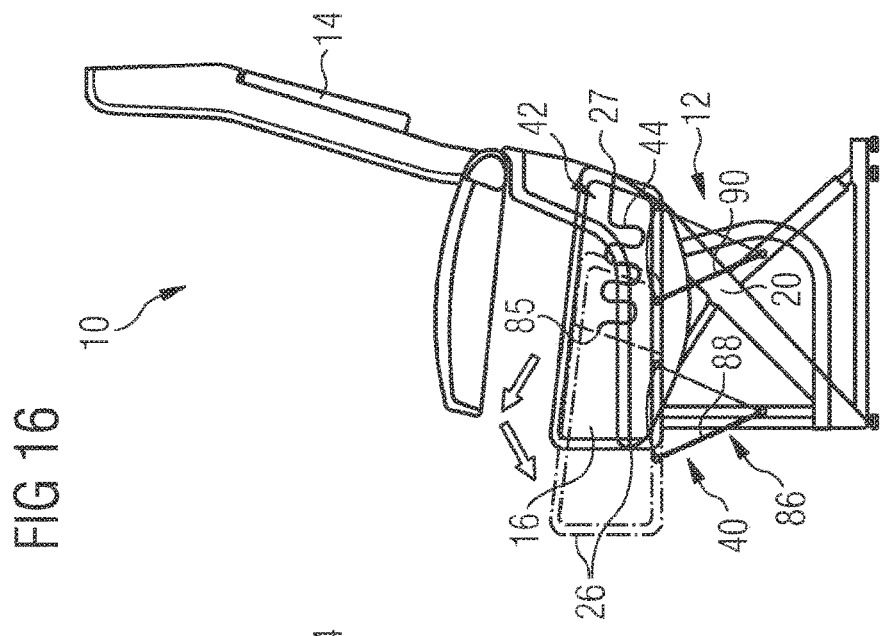
FIG. 14 shows a side view of a second embodiment of a passenger seat which is suitable for installation in the passenger cabin area according to FIG. 1 and has a seat element which is arranged in an out-of-use position.
Figure 15:
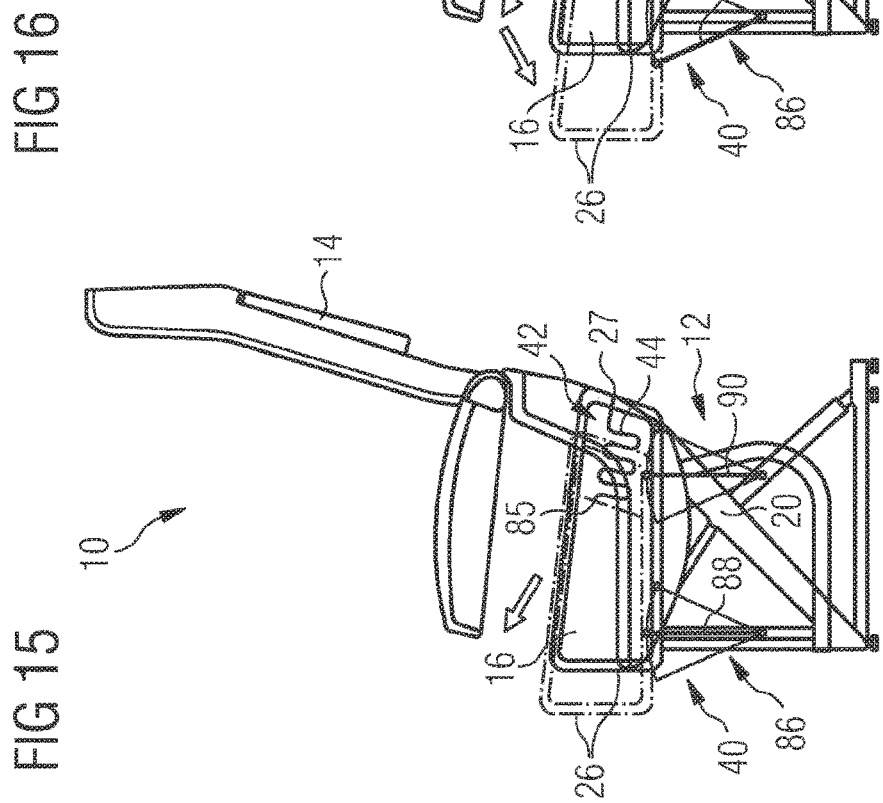
FIG. 15 shows a side view of the passenger seat according to FIG. 14, with a seat element arranged in an intermediate position.
Figure 16:
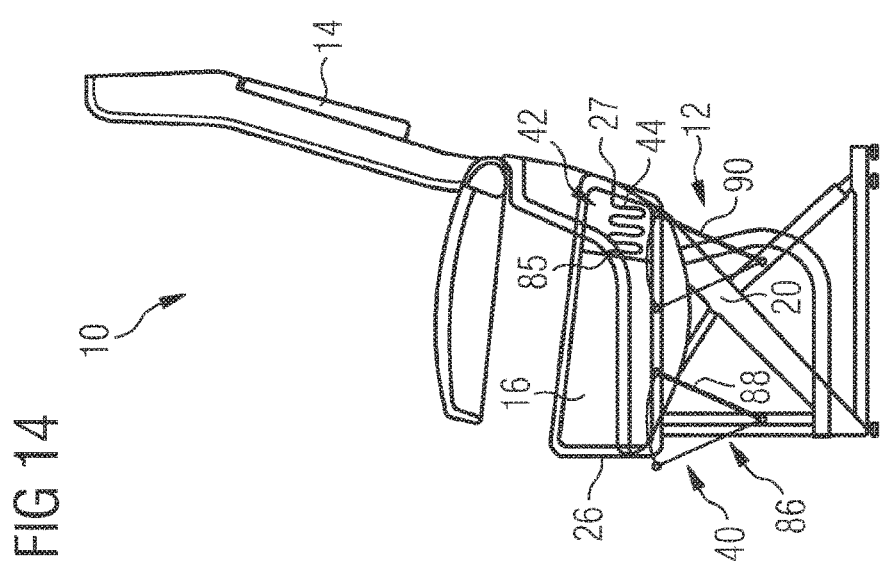
FIG. 16 shows a side view of the passenger seat according to FIG. 14, with a seat element arranged in a usable position.

A second embodiment of a passenger seat 10 is depicted in FIGS. 14 to 16. In this embodiment, the passenger seat 10 comprises a displacing mechanism 40, wherein the first end of the spring 44 of the spring arrangement 42 is fastened to the carrier structure 12 in an area that faces a back edge 27 of the seat element 16. The second end of the spring 44 is fastened to a fastening face 85 which extends at a distance from the back edge 27 of the seat element 16 substantially parallel to the back edge 27 of the seat element 16.

Furthermore, the passenger seat 10 shown in FIGS. 14 to 16 is equipped with a displacing mechanism 40 which comprises a parallelogram mechanism 86. The parallelogram mechanism 86 includes a first arm 88 and a second arm 90 which extend substantially parallel to each other. The first arm 88, in the region of its first end, is pivotably connected to the part 20 of the carrier structure 12 which carries the seat element 16. In the region of its second end, the first arm 88 is pivotably connected to the seat element 16. In particular, the first arm is connected to the part 20 of the carrier structure 12 which carries the seat element 16 and an underside of the seat element 16 in a region of the front edge 26 of the seat element. To the contrary, the second arm 90 is connected to the part 20 of the carrier structure 12 which carries the seat element 16 and the underside of the seat element 16 in a region of the rear edge 27 of the seat element 16.

When the seat element 16 is arranged in its out-of-use position as shown in FIG. 14, the first and the second arm 88, 90 are inclined towards the backrest 14 of the passenger seat 10. To the contrary, when the seat element is arranged in its usable position as depicted in FIG. 16, the first and the second arm 88, 90 are inclined away from the backrest 14 of the passenger seat 10. In an intermediate position, in which the seat element is arranged upon being displaced between its out-of-use position and its usable position and which is shown in FIG. 15, the first and the second arm 88, 90 extend substantially perpendicular to the underside of the seat element 16.

Thus, in a passenger seat 10, wherein the displacing mechanism 40 comprises a parallelogram mechanism 86, the movement of the seat element 16 between its out-of-use position and its usable position is no longer a translatory movement in only one plane. Instead, the movement of the seat element 16 follows a circular arc. Hence, upon being displaced between its out-of-use position and its usable position by means of the parallelogram mechanism 86, the seat element 16, in its intermediate position, is elevated from the part 20 of the carrier structure 12 which carries the seat element 16 in its out-of-use position and its usable position. This "elevation" of the seat element 16 has at least some delaying effect on the displacing movement of the seat element between its usable position and its out-of-use position. Otherwise the structure and the function of the second embodiment of the passenger seat correspond to the structure and the function of the first embodiment.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger seat comprising:
   a carrier structure;
   a backrest fastened to the carrier structure; and
   a seat element fastened to the carrier structure independently of the backrest so as to be selectively displaceable independent of the backrest, relative to the backrest, in a direction of depth of a seating surface of the seat element between a usable position and an out-of-use position,
- wherein, in a usable position, said seat element is arranged in such a way, relative to the backrest, that a front edge of said seat element that faces away from the backrest is arranged at a first distance from a backrest surface of said backrest, and
- wherein, in an out-of-use position, said seat element is received, at least partially, in a gap provided between a part of the carrier structure that carries said seat element and an edge of the backrest that faces towards said seat element, so that the front edge of the seat element is arranged at a second distance from the backrest surface of the backrest that is less than the first distance,
- wherein a front edge, which faces away from the backrest, of that part of the carrier structure which carries the seat element is in alignment with the front edge of said seat element when said seat element is in the out-of-use position, and,
- wherein the gap provided between that part of the carrier structure which carries the seat element and that edge of the backrest which faces towards said seat element is closed by a cover attached in an area of a rear side of the backrest.

2. The passenger seat according to claim 1, wherein the seat element protrudes, in the out-of-use position, into the gap provided between that part of the carrier structure which carries the seat element and that edge of the backrest which faces towards said seat element, and fills up said gap, so that a rear edge of the seat element that faces towards the backrest when said seat element is in the usable position is arranged at a third distance from a rear side of the backrest.

3. The passenger seat according to claim 1, further comprising at least one of:
- wherein said seat element comprises a carrier plate comprising a rigid material, and also a seat pad positioned on said carrier plate, or
- wherein said carrier plate is provided with an opening in an area of the gap provided between that part of the carrier structure which carries the seat element and that edge of the backrest which faces towards said seat element.

4. The passenger seat according to claim 3, further comprising at least one of:
- wherein the carrier plate comprises a first section and a second section displaceable relative to said first section, or
- wherein the seat pad is compressible or foldable, in an area that faces towards the backrest.

5. The passenger seat according to claim 1, further comprising at least one of:
- a displacing mechanism configured to displace the seat element relative to the backrest between the usable position and the out-of-use position;
- a delaying mechanism configured to delay a displacing movement of the seat element between the usable position and the out-of-use position; or
- a damping mechanism configured to dampen the displacing movement of the seat element between the usable position and said the out-of-use position, and
- wherein said damping mechanism comprises at least one of a compressible area of a seat pad belonging to the seat element or at least one oil-pressure damper.

6. The passenger seat according to claim 5, wherein
- the displacing mechanism comprises a spring arrangement which biases the seat element into the out-of-use position, the spring arrangement including at least one spring which extends substantially parallel to a direction of depth of the seating surface of the seat element,
- a first end of the spring is fastened to the carrier structure, and
- a second end of the spring is fastened to said seat element.

7. The passenger seat according to claim 6, wherein
- the first end of the spring is fastened to the part of the carrier structure which carries the seat element in an area adjacent to the backrest, and
- the second end of the spring is fastened to a holding element attached to the seat element in an area of an underside of said seat element that faces away from the backrest.

8. The passenger seat according to claim 6, wherein
- the first end of the spring is fastened the carrier structure in an area that faces a back edge of the seat element, and
- the second end of the spring is fastened to a fastening face which extends substantially parallel to the back edge of the seat element.

9. The passenger seat according to claim 5, wherein
- the displacing mechanism comprises a guide apparatus for guiding the seat element upon being displaced between the usable position and the out-of-use position,
- said guide apparatus comprises a guide element of bar-shaped construction and fastened to the seat element and received in a guide rail attached to that part of the carrier structure which carries said seat element.

10. The passenger seat according to claim 5, wherein the displacing mechanism comprises a parallelogram mechanism including:
- a first arm that, in a region of a first end of the first arm, is pivotably connected to the part of the carrier structure which carries the seat element and, in a region of a second end of the first arm, is pivotably connected to the seat element, and
- a second arm that extends substantially parallel to the first arm and, in a region of a first end of the second arm, is pivotably connected to the part of the carrier structure which carries the seat element and, in a region of a second end of the first arm, is pivotably connected to the seat element.

11. The passenger seat according to claim 1, further comprising a locking mechanism for locking the seat element in the usable position, and further comprising at least one of
- wherein said locking mechanism is configured to allow a displacement of the seat element from the out-of-use position into the usable position, but to prevent a displacement of the seat element from the usable position into the out-of-use position when a force applied to the seat element by a user of the passenger seat is acting upon said seat element, or
- wherein said locking mechanism is configured to unlock automatically when no force applied to the seat element by a user of the passenger seat is acting upon said seat element.

12. The passenger seat according to claim 11, wherein the locking mechanism comprises at least one of:
- a pneumatic cylinder coupled to the seat element, a valve and an actuator, wherein the valve, in an open state, allows an exchange of air between the pneumatic cylinder and an ambient atmosphere such that the seat element is displaceable between the out-of-use position and the usable position, and, by means of the actuator, is movable into a closed state in which the valve prevents an exchange of air between the pneumatic cylinder and an ambient atmosphere such that the seat element is prevented from being displaced from the usable position into said the out-of-use position, and wherein the actuator is configured to be moved into an actuated state to move the valve into the closed state when a force applied to the seat element by a user of the passenger seat is acting upon said seat element, the actuator being biased into a non-actuated state; or a tooth rack, a latching element and an actuator, wherein the latching element, in a disengaged position, does not engage with the tooth rack such that the seat element is displaceable between the out-of-use position and the usable position, and, by means of the actuator, is movable into an engaged position in which the latching element engages with the tooth rack such that the seat element is prevented from being displaced from the usable position into the out-of-use position, and wherein the actuator is configured to be moved into an actuated state in which said actuator moves the latching element into the engaged position when a force applied to the seat element by a user of the passenger seat is acting upon said seat element, the actuator being biased into a non-actuated state.

13. The passenger seat according to claim 11, wherein the locking mechanism comprises:

a tooth rack, a latching element and an actuator, wherein the latching element, in a disengaged position, does not engage with the tooth rack such that the seat element is displaceable between the out-of-use position and the usable position, and, by means of the actuator, is movable into an engaged position in which the latching element engages with the tooth rack such that the seat element is prevented from being displaced from the usable position into the out-of-use position, and wherein the actuator is configured to be moved into an actuated state in which said actuator moves the latching element into the engaged position when a force applied to the seat element by a user of the passenger seat is acting upon said seat element, the actuator being biased into a non-actuated state.

14. The passenger seat according to claim 1, further comprising:
a seat belt configured to secure a passenger sitting on the passenger seat.

15. The passenger seat according to claim 1, further comprising a handle attached in an area of the front edge of the seat element,
wherein the handle is attached to an underside of the seat element that faces away from the backrest, and said handle extends substantially perpendicularly from said underside of the seat element.

16. The passenger seat according to claim 1, wherein the backrest comprises a first portion facing away from the seat element and a second portion facing the seat element and being connected to the first portion and the seat element in an articulated manner such that the second portion of the backrest, upon displacing the seat element from the out-of-use position into the usable position, is pivoted relative to the first portion of the backrest and the seat element in order to reduce a first angle defined between the first and the second portion of the backrest and to simultaneously enlarge a second angle defined between the second portion of the backrest and the seat element.

17. A passenger cabin area which comprises:
a main aisle which extends substantially parallel to a longitudinal axis of the passenger cabin area;
an exit;
a transverse aisle which connects the main aisle to the exit; and
at least one passenger seat according to claim 1 arranged in the passenger cabin area adjacent to the transverse aisle in such a way that the seat element of the passenger seat faces towards said transverse aisle.

18. The passenger cabin area according to claim 17, wherein the exit is an emergency exit.

\* \* \* \* \*